Aug. 30, 1955     H. LUND     2,716,690
METHOD OF PREPARING GALVANIZED PARTS FOR WELDING
Filed July 8, 1950

INVENTOR.
Harold S. Lund
BY Andrus & Sceales
ATTORNEYS.

United States Patent Office 2,716,690
Patented Aug. 30, 1955

2,716,690

METHOD OF PREPARING GALVANIZED PARTS FOR WELDING

Harold Lund, Milwaukee, Wis., assignor to A. O. Smith Corporation, Milwaukee, Wis., a corporation of New York Application July 8, 1950, Serial No. 172,732

6 Claims. (Cl. 219—10)

This invention relates to a method of making welded galvanized articles, and particularly to a method of treating galvanized stock to prepare the same for welding into water tanks and the like.

In the manufacture of galvanized tanks for hot water heaters, considerable difficulty has been experienced in the making of satisfactory fusion welds between the cylindrical shell of the tank and the heads at each end thereof. This difficulty has resulted from the fact that the zinc, when heated by the welding arc, boils off with a violent reaction that makes the weld metal porous. It has been found possible to make fair welds between galvanized parts by puddling with a hand arc or by welding at low speeds with an automatic welding head, but submerged arc welding, with its desirable high speed features, may not be performed without previously removing the zinc from the areas to be welded.

An object of the present invention is to provide a method of rapidly and completely removing the zinc from accurately defined weld areas on the galvanized stock for water tanks and the like.

Another object of the invention is to provide a method of forming galvanized articles having welds which are free from porosity and other defects resulting from the presence of zinc in the weld areas.

Another object is to provide an induction heating method whereby heat may be concentrated to remove the zinc from a precisely determined band on one surface of the galvanized part being treated, thereby maintaining the protective zinc coating on adjacent areas both on the welding surface of the part and on the opposite surface thereof.

Another object of the invention is to provide a zinc removal method which may be completed in a sufficiently short time to prevent excessive heat conduction to areas on which it is desired to retain the protective zinc coating.

Another object is to provide a method of forming welded galvanized articles wherein the induction heating step and the welding step are performed in rapid succession, thereby utilizing the induction heating step for pre-heating as well as for zinc removal.

The method of the invention comprises placing suitably shaped induction heating elements in close proximity with the weld areas of the galvanized stock to be welded, applying relatively high frequency current for a time interval sufficient to heat the weld areas and effect removal of the zinc coating thereon, and subsequently assembling the treated parts and welding the same into the completed article. In another embodiment of the invention, the article is assembled prior to zinc removal and the welding step is performed immediately upon completion of the induction heating operation.

These and other objects and advantages will be set forth more fully in the following description of embodiments of the invention illustrated in the accompanying drawings.

Figure 1:
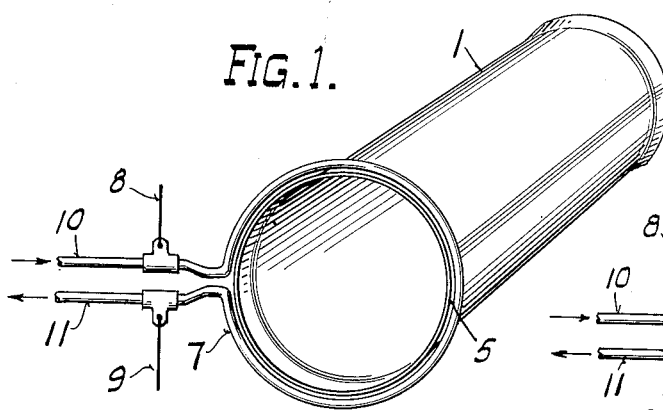
Figure 1 is a perspective illustration of the induction heating element as employed in burning zinc from one end of a tank cylinder.
Figure 2:
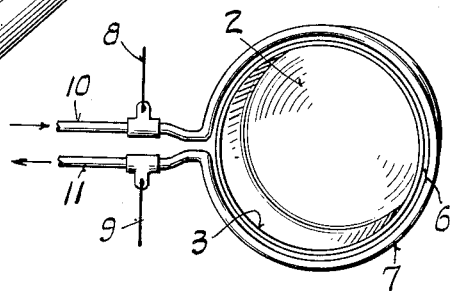
Fig. 2 is a corresponding view, showing zinc removal from one of the dished heads of the tank.
Figure 3:
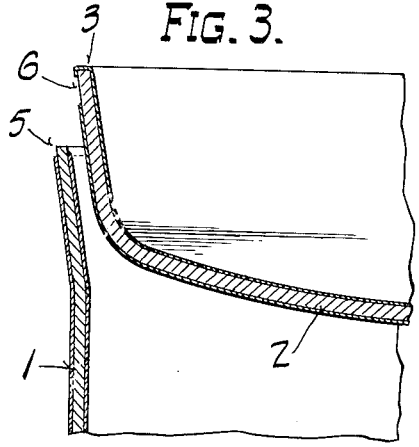
Fig. 3 is an exploded fragmentary cross-sectional view of a cylinder and head after the zinc has been removed from welding bands at the meeting edges of the parts.

The invention is illustrated in the drawings as employed in the manufacture of a water heater tank having a cylindrical body portion 1 and a pair of inwardly dished heads 2. The cylinder 1 is preferably flared at its ends to provide seating surfaces for the heads 2 and to hold the rims 3 of the heads in slightly protruding relation, so that circumferential grooves are formed for the upper and lower fillet welds 4 which unite the members into a unitary structure.

In manufacturing the tank, the heads 2 and body cylinder 1 are separately galvanized to protect the iron or steel base metal from the atmosphere and from the corrosive action of the fluid to be stored. It is desirable, in order to maintain a high degree of protection, that the zinc coating formed during galvanizing be retained except at accurately defined weld areas.

According to the invention, an induction heating process is employed to remove the zinc from a band 5 at each end of the cylinder 1 and from a corresponding band 6 on the rim of each head 3. Bands 5 extend over both the exterior and interior edges of cylinder 1, as well as at the extreme edges thereof, whereas bands 6 are preferably disposed solely on the exterior or welding surfaces of the rims 3.

The ends of the tank being similar, the following description will be made with reference to only one end of the cylinder 1 and to the related head 2.

Referring to Fig. 1, the apparatus used in performing the method of the invention comprises a generally annular induction heating element 7 of slightly greater diameter than the tank. The element 7 is preferably formed of hollow copper tubing and is connected through supply lines 8 and 9 to a suitable source of alternating current, not shown. In order to prevent element 7 from overheating, as a result of the heavy currents flowing therein during zinc removal, water is piped through the element by means of supply and discharge hoses 10 and 11 connected at the ends thereof.

In operation, heating element 7 is arranged with its inner surface in close proximity with the exterior edge of cylinder 1, corresponding to band 5. Alternatively, depending upon the exact results desired, element 7 could be made slightly smaller and axially spaced from the cylinder or placed adjacent the interior edge thereof.

A relatively high frequency alternating, pulsating, or varying current is then applied to the element 7 and corresponding currents are induced in the contiguous welding band 5 of cylinder 1 to rapidly heat the same and cause the zinc coating thereon to burn off with a violent reaction, similar to the burning of magnesium.

The length of the burning interval, as well as the frequency and magnitude of the inducing current and the spacing of the element 7 from the work, are regulated to provide a burned band 5 of approximately a quarter to a half an inch in width. This band is preferably slightly greater in area than the weld to be made thereon in order to prevent zinc from flowing into the weld puddle due to the intense heat generated in submerged arc welding.

Since, for a given amperage in the element 7 and a given spacing between the element and the work, the time interval necessary to effect zinc removal varies inversely with the frequency to the inducing current, it is desirable that a relatively high frequency be employed. The short heating period thus attained, as well as the current concentration due to proximity effect, prevents excessive heating of areas outside the band 5 and results in a uniform band having even and regular edges.

Excellent results have been achieved with currents in the neighborhood of 400 amperes and frequencies of approximately 450 kilocycles, with the heating periods ranging from a few seconds up to 20 seconds. Other frequencies and currents may be employed, but it has been found that low frequency heating, for example at 60 cycles, is unsatisfactory except for heating large objects or objects where the extent of the zinc removal area is not critical.

The use of a high frequency inducing current also operates through proximity effect to concentrate the induced current, and thus the heat, in the zinc coated surface of the cylinder 1 adjacent the element 7. The zinc is accordingly burned off the band 5 with a minimum of energy and expense, and in a very short period of time.

The head 2 is next prepared for welding, in substantially the same manner as the cylinder 1 and with the same or similar induction heating elements, by burning the zinc from the band 6 on the outer surface of the rim 3. By using high frequencies it is possible, where the thickness of the head is substantial, to remove the zinc from the outer or welding surface of the rim 3 in a sufficiently short time to prevent excessive heat penetration to the inner surface thereof. The heat penetration to the inner rim surface is thus insufficient to cause zinc removal therefrom.

Figure 4:
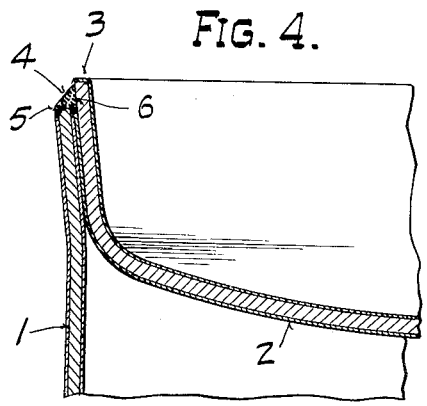
Fig. 4 is a similar view of the tank after welding.

The bands 5 and 6 on the cylinder and head, respectively, are then cleaned to remove any residue of zinc oxide or other material which may be detrimental to welding. The cleaning may be performed in any suitable manner, for example by brushing or by chemical action. Thereafter, the parts are assembled, as shown in Fig. 4, and the tank is completed by making fillet weld 4 in the circumferential groove bounded by the protruding band 6 of head 2 and the exterior band 5 at the edge of cylinder 1. The submerged arc welding process, made possible in galvanized article manufacture as a result of zinc removal, is preferably employed in making weld 4 because of the improved weld quality and greatly increased welding speed thereby attained.

As as alternative to the separate induction heating of the cylinder 1 and head 2, a modified method is practiced wherein zinc removal is effected after assembly of the parts but prior to the welding thereof. Under the modified method of the invention, the head 2 is first assembled with the cylinder 1 and the zinc is burned from a predetermined weld area at the meeting edges of the parts by the high frequency induction heating thereof. Thereafter, the burned welding area may be cleaned by brushing or the like, and a weld is made between the meeting edges to unite the head with the cylinder.

The zinc removal may either be performed with an annular induction heating element, to simultaneously heat the entire extent of the assembled edges, or with an arc shaped element to successively treat adjacent segments of the edges. In the former case the cleaning and welding steps are performed after zinc removal is entirely completed, whereas in the latter case the heating, cleaning, and welding operations may be performed substantially simultaneously on adjacent portions of the weld area.

The apparatus employed in performing the modified method may comprise an induction heating element 12 shaped to fit over the assembled edges of the parts 1 and 2, an arc welding head 13 spaced a short distance along the edges from element 12, and a brush mechanism 14 arranged between the element 12 and welding head 13 to clean the welding surfaces prior to the welding thereof. The tank is rotated about the axis of cylinder 1 by a suitable means, not shown.

The element 12 is constructed of a hollow copper tube and is preferably formed with concentric curved portions 15 which are arranged in laterally spaced relation closely adjacent the opposite surfaces of the assembled rim 3 and the flared edge of cylinder 1. In order to complete the inducing current circuit, U-shaped connecting portions 16 are provided at the ends of portions 15 for looping over the edges of the parts.

As in the case of the first embodiment of the invention the heating element is cooled by water piped therethrough and is connected to a suitable source of alternating current supply. The length of the element, which is determined by the speed of welding and by the magnitude and frequency of the inducing current, is shown in the drawings as corresponding to a ninety degree segment of the tank edge.

The brush mechanism 14 is preferably of the motor drive rotary type and has a bristled portion 17 of approximately the same width as the exterior area from which the zinc is removed by heating element 12. Welding head 13, of any suitable automatic variety, is shown as having a flux feeding trough 18 for submerged arc welding.

Figure 5:
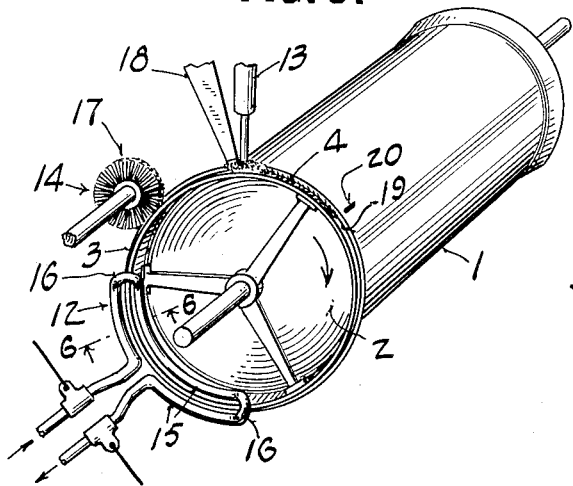
Fig. 5 is a schematic illustration of an embodiment of the invention wherein the induction heating step is performed after assembly of the tank and as part of a continuous heating, cleaning and welding operation.
Figure 6:
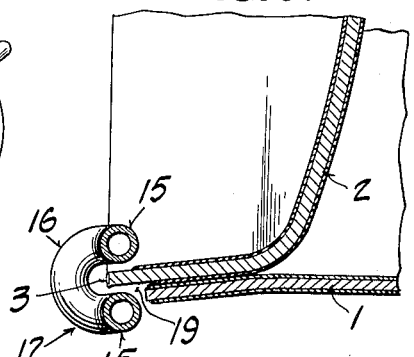
Fig. 6 is a partial cross-section taken along line 6—6 of Fig. 5.

In practicing the zinc removal and welding method with the apparatus illustrated in Fig. 5, the head 2 is assembled with cylinder 1 and the parts are held in assembled relation by any suitable means, not shown. The tank is then arranged in the apparatus and rotated, preferably at a uniform speed, in such a direction that the tank edge portions will be treated first by the heating element, then by the brush, and finally by the welding head.

Simultaneously with the commencement of tank rotation a relatively high frequency inducing current is applied to the element 12, as in the first embodiment of the invention, to begin progressive zinc removal from a circumferential band 19 at the assembled edges of the parts.

Referring to Fig. 5, the following description will have reference to a starting point 20 which is initially disposed, before rotation of the tank or application of the inducing current, beneath heating element 12 at the opposite end thereof from welding head 13. Point 20 first passes beneath element 12 and is subjected to the zinc removal operation previously described. As the point 20 reaches the brush mechanism 14, the brushing action is started to clean the burned area at the point 20 and at all succeeding points around the circumference of the tank.

The welding head 13, which is set in operation immediately upon being reached by point 20, then operates to make the fillet weld 4 in the groove between rim 3 and the edge of cylinder 1. Because of the relatively short distance between the heating and welding elements, point 20 arrives at the welding head while in a desired preheated condition.

After the tank has made a complete revolution, the operations of the various portions of the apparatus are discontinued in accordance with the order in which they were started, that is to say the heating element 12, brush mechanism 14, and welding head 13 are shut off as soon as they are reached by point 20. The weld 4 being completed, the tank is removed from the apparatus, inspected, and prepared for assembly into the completed hot water heater.

The operations described in connection with both embodiments of the invention could, for increased production speed, be performed simultaneously on both ends of the tank.

The use of induction heating for zinc removal is highly effective in that the zinc may not only be removed rapidly and cheaply, but it may be removed from definite predetermined weld areas which permit high speed and high quality welds to be made while producing a tank with a maximum degree of corrosion resistance.

Various embodiments of the invention may be employed within the scope of the following claims.

I claim:

1. In a method of making a welded galvanized article, the steps of arranging an induction heating element closely adjacent a predetermined weld area on a galvanized component part of said article, applying a relatively high frequency inducing current to said element for a time interval sufficient to cause induction heating of said predetermined area and substantial zinc removal therefrom but insufficient to cause zinc removal from adjoining areas, and making a weld between said exposed predetermined area and a corresponding area of a complementary galvanized part to unite the article.

2. In a method of producing a welded water heater tank from a galvanized shell and a galvanized head, the steps of induction heating a predetermined strip on the periphery of said head and an end portion of said shell, said induction heating being continued for a sufficient period of time to burn the zinc coating from said strip and end portion, disposing the head within the shell to locate said strip in substantially contiguous relation with said end portion, and thereafter fusion welding said head to said shell at the contiguous areas by depositing weld metal in contact with said strip and said end portion at their junction.

3. In a method of making a welded galvanized article, the steps of assembling the galvanized component parts of said article, placing an induction heating element closely adjacent a predetermined welding area comprising the contiguous portions of said component parts, applying an alternating current to said heating element for a sufficient period of time to heat said welding area by induction and effect substantial zinc removal therefrom, and making a fusion weld between said component parts at said welding area to complete the article.

4. In a method of making a welded galvanized article, the steps of assembling the galvanized component parts of said article, placing an induction heating element closely adjacent a predetermined welding area comprising the contiguous portions of said component parts, applying an alternating current to said heating element for a sufficient period of time to heat said welding area by induction and burn the zinc coating therefrom, and thereafter making an arc weld between said component parts at said welding area while said parts are in a pre-heated condition as a result of said induction heating operation.

5. A method of producing a welded water heater tank from a galvanized cylindrical body portion and a galvanized disc-like head portion, which comprises assembling said head portion with said body portion, arranging an induction heating element closely adjacent a predetermined welding area at the meeting edges of said body and head portions, applying a relatively high frequency alternating current to said heating element to heat said welding area by induction and burn the zinc coating therefrom, and thereafter making a fusion weld at said welding area between said meeting edges to unite said portions.

6. A method of producing a welded water heater tank from a galvanized cylindrical body portion and a galvanized disc-like head portion, which comprises assembling said head portion with said body portion, burning the zinc coating from a predetermined welding area at the meeting edges of said body and head portions by the successive high frequency induction heating of segments of said welding area, cleaning the burned welding area to remove the residue remaining thereon, and making an arc weld between said meeting edges at the portion of said welding area exposed by said induction heating and cleaning steps, said operations being performed substantially simultaneously on adjacent segments of said meeting edges and continued until said edges are welded along the entire extent thereof.

References Cited in the file of this patent

UNITED STATES PATENTS

| | | |
|---|---|---|
| 1,150,560 | Van Moore | Aug. 17, 1915 |
| 1,190,208 | Williams | July 4, 1916 |
| 1,971,822 | Klein | Aug. 28, 1934 |
| 2,024,906 | Bennett | Dec. 17, 1935 |
| 2,170,019 | Gaylord | Aug. 22, 1939 |
| 2,363,990 | Priebe | Nov. 28, 1944 |
| 2,365,958 | Holslag | Dec. 26, 1944 |
| 2,477,411 | King | July 26, 1949 |
| 2,528,758 | King | Nov. 7, 1950 |